United States Patent [19]

Mikel

[11] 4,133,671
[45] Jan. 9, 1979

[54] METHOD AND APPARATUS FOR ENHANCING FERTILIZING CHARACTERISTICS OF IRRIGATION WATER

[75] Inventor: Merle E. Mikel, Visalia, Calif.

[73] Assignee: Fuel, Inc., Hugoton, Kans.

[21] Appl. No.: 888,840

[22] Filed: Mar. 22, 1978

Related U.S. Application Data

[63] Continuation-in-part of Ser. No. 786,198, Apr. 11, 1977, abandoned.

[51] Int. Cl.² ............................................. C05C 11/00
[52] U.S. Cl. ........................................ 71/54; 71/64 C; 71/64 SC; 423/194; 423/351; 423/405
[58] Field of Search .................. 71/1, 54, 61, 63, 64 C, 71/64 SC; 210/169, 170; 60/301, 310; 423/174, 351, 405; 55/68, DIG. 30

[56] References Cited

U.S. PATENT DOCUMENTS

| 2,936,548 | 5/1960 | Morrison | 71/1 X |
| 3,370,914 | 2/1968 | Gross et al. | 60/301 X |
| 3,888,652 | 6/1975 | Yie et al. | 71/64 C |

Primary Examiner—Ferris H. Lander
Attorney, Agent, or Firm—Fulwider, Patton, Rieber, Lee & Utecht

[57] ABSTRACT

A method and apparatus for enhancing fertilizing characteristics of irrigation water by adding carbon dioxide and nitrogenous compounds, derived from exhaust gases, to irrigation water so as to produce a fertilizing solution which promotes crop growth. The method comprises scrubbing exhaust gases derived from a natural gas, liquified petroleum or diesel engines by utilizing direct contact with water and thereafter injecting the treated enriched water into a standard supply of irrigation water. The engine is operated so as to provide the greatest amount of carbon dioxide, and ($NO_x$) nitrogen oxides practical.

5 Claims, 7 Drawing Figures

U.S. Patent    Jan. 9, 1979    4,133,671
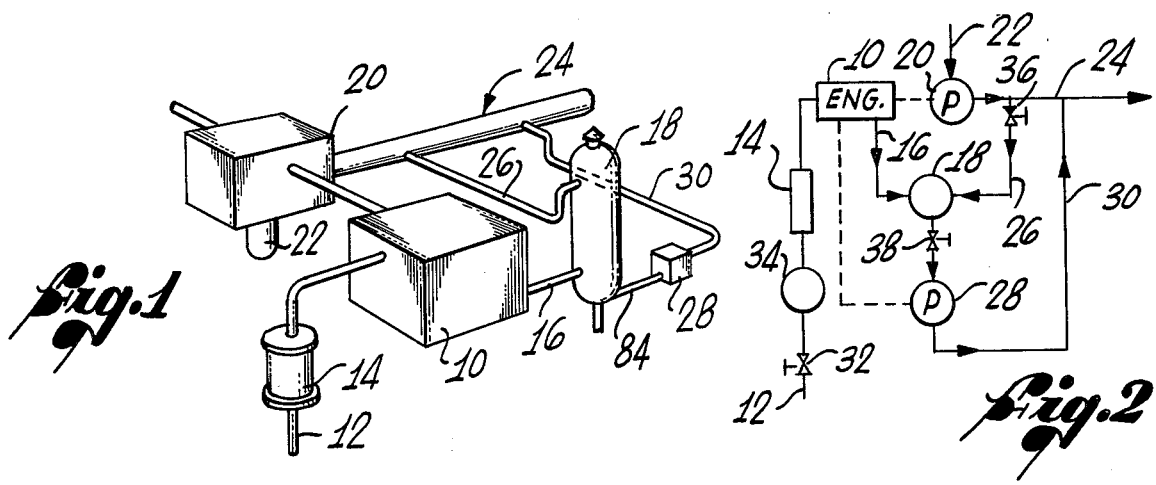
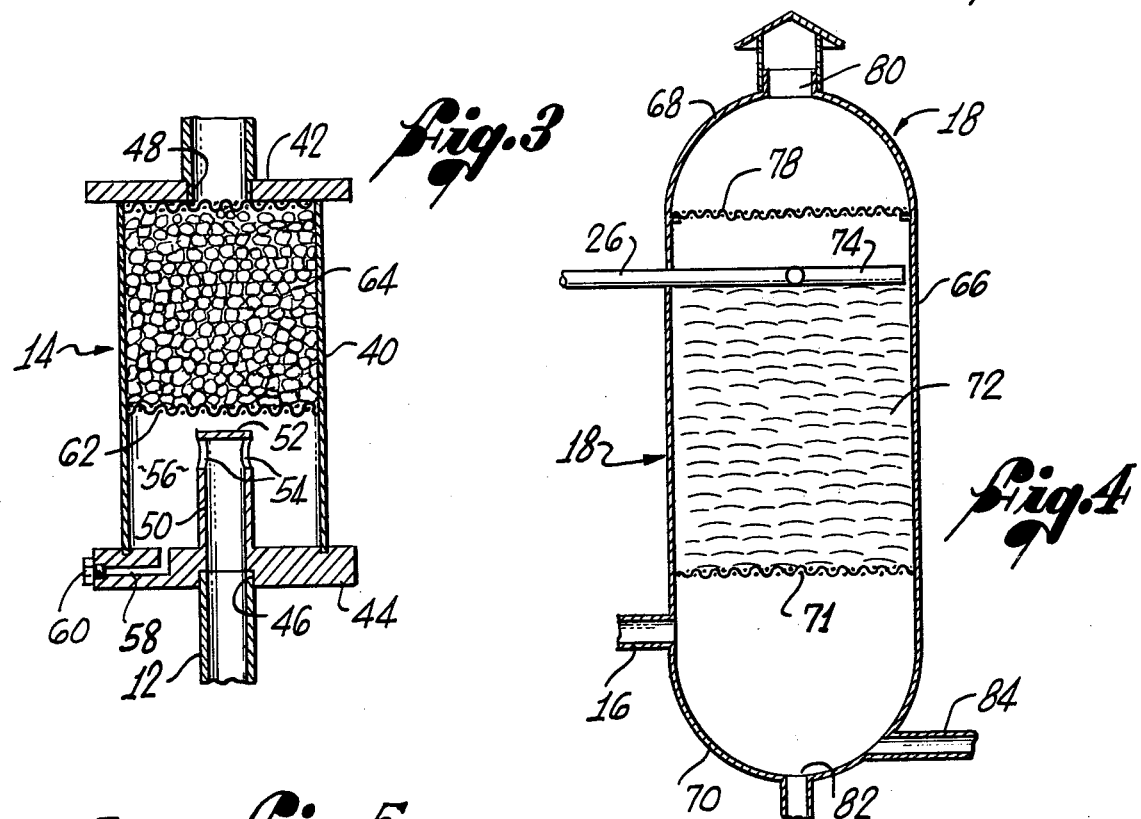
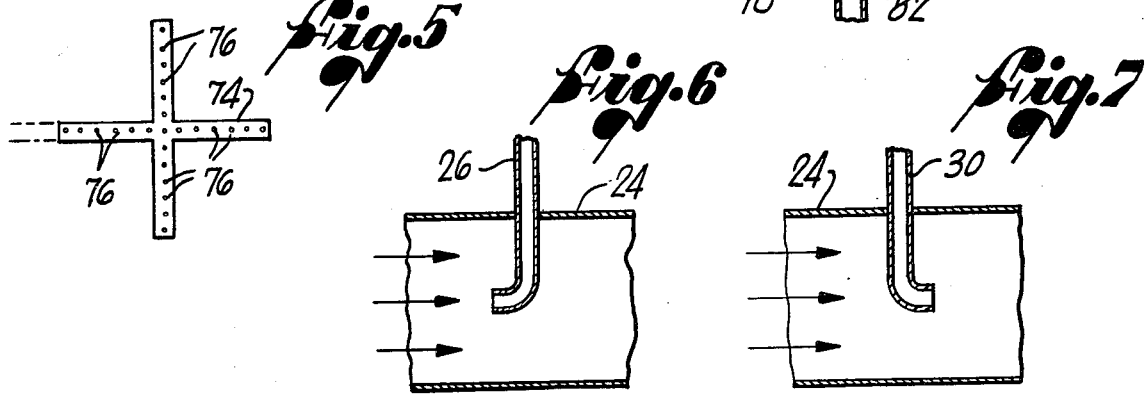

METHOD AND APPARATUS FOR ENHANCING FERTILIZING CHARACTERISTICS OF IRRIGATION WATER

CROSS-REFERENCE TO RELATED APPLICATION

This application is a continuation-in-part of my prior United States application, Ser. No. 786,198, filed Apr. 11, 1977 for METHOD AND MEANS FOR FERTILIZING which is now abandoned in favor of this application.

BACKGROUND OF THE INVENTION

This invention relates generally to a method and apparatus for enhancing fertilizing characteristics of irrigation water.

In a number of areas of the world, it is possible to tap underground sources of natural gas by relatively simple wells and equipment. Moreover, in many geographical areas where such gas can be easily extracted and secured, such areas are also suitable for agricultural growth.

In the United States, certain farming areas in the Mid-West, for example, overlie petroleum deposits. In these areas, it is not uncommon for farmers to drill a well so as to tap a fuel source such as natural gas and then use this gas to power an internal combustion engine which is used to drive an irrigation pump. Accordingly, the underground water is brought up from the earth by pumping and discharging it into a suitable irrigation network to provide water for crop growth.

Needless to say, it is desirable, if not necessary, to also provide means for fertilizing the crops to simulate growth and secure the greatest crop yield. While a soluble form of nitrogeous compounds and carbon dioxide is not a complete fertilizer in and of itself, such a mixture is one of the most important constituents added to soil for ensuring a supply of the nutrients needed.

Moreover, in some geographical areas which have alkali soil, salts present in the soil are deleterious to crop growth. Such soil may also have poor water penetration which will also inhibit crop growth and resultant yield. Other areas have imbalanced pH soil which prevents release of plant nutrients and inhibits the desirable decay of organic matter in the soil.

An internal combustion engine such as a natural gas, liquified petroleum or diesel engine, of course, makes use of air to provide oxygen necessary for combustion. Resultant exhaust gases derived from such engines include water vapor, $CO_2$ hydrocarbons as well as $NO_x$ gases. Approximately four-fifths of the intake air to the engine is nitrogen which does not enter into the combustion process per se but rather is converted, at least to some extent, into the various oxides of nitrogen ($NO_x$). These exhaust gases $CO_2$, nitrogen oxides such as $NO$, $NO_2$ and other nitrogenous compounds, are partially soluble in water or capable of being suspended in water and provide a solution that may be used by plants as a fertilizer. Fortuitously, the exhaust materials which result from the combustion process and which would otherwise be polluting the atmosphere are instead converted into a desirable fertilizing solution for promoting crop growth.

Hence, those concerned with the stimulation of crop growth and utilization of various geographical areas for agricultural purposes have recognized a significant need for improving soil characteristics and reducing pollution at a modest cost while at the same time providing a fertilizing solution. The present invention fulfills this need.

SUMMARY OF THE INVENTION

Briefly, and in general terms, the present invention provides a unique method and apparatus for promoting crop growth and for irrigating a selected agricultural site by scrubbing exhaust gases from a natural gas, liquified petroleum or diesel engine and utilizing the resultant acqueous solution for crop irrigation.

Basically, the present invention comprises a system of irrigation in which an engine driving an irrigation pump is powered by a natural gas, liquified petroleum, diesel fuel or mixtures thereof. Exhaust gases from the engine are cleaned of at least a portion of contaminates that may be present and such gases are thereafter directly contacted with water to form a fertilizing solution. The engine is adjusted to provide the greatest possible amount of carbon dioxide and oxides of nitrogen and these oxides are then dissolved in water that is injected into the main stream of irrigation water for treating crops.

More specifically, and in a presently preferred embodiment of the invention, the system of irrigation includes an internal combustion engine which drives a pump for delivering water to a discharge pipe connected to a suitable irrigation network. A portion of the water is diverted through a pipe to a scrubbing means, such as a water tower, which is used for absorption of the carbon dioxide and nitrogen oxides ($NO_x$) components of the exhaust gases derived from the engine.

Accordingly, the system of the present invention provides usable nitrogen and carbon dioxide which in turn beneficially lowers the pH of water used to irrigate and fertilize crops. The amounts of these components derived from exhaust gases will of course vary according to engine cubic inch displacement, revolutions per minute, exhaust temperature, carburation, ignition and type of fuel. Thus, the aforementioned environmental problems related to deleterious soil conditions and pollutants contaminating the atmosphere are substantially improved by the present irrigation system.

The above and other objects and advantages of this invention will become apparent from the following more detailed description, when taken in conjunction with the accompanying drawings of an illustrative embodiment.

BRIEF DESCRIPTION OF THE DRAWINGS

FIG. 1 is a perspective view of a representative assembly of elements that go to make up the improved irrigation system herein described;

FIG. 2 is a form of flow diagram indicating the connections of the various units and the flow of fluids to and through them;

FIG. 3 is a cross-sectional view of a filter, particularly adapted for use in removing at least some of the contaminants from the gas fuel;

FIG. 4 is a cross-sectional view of the tower used in absorbing carbon dioxide gas and the oxides of nitrogen in water;

FIG. 5 is a plan view of the representative form of atomizer that may be used in the tower;

FIG. 6 is a sectional view showing a Pitot tube in the discharge line; and

FIG. 7 is a sectional view showing a venturi tube in the discharge line.

DESCRIPTION OF THE PREFERRED EMBODIMENT

The basic elements of the present system include, as indicated in FIG. 1, an internal combustion engine 10 such as a 6 to 16 cylinder automobile or industrial engine manufactured by Ford, Catapiller, GMC, Chrysler or Cummins that is powered by a fuel such as natural gas, liquified petroleum, diesel fuel or mixtures thereof, and provided by pipe 12 that may be connected to a source of fuel such as a suitable well. The fuel from the pipe 12 passes through a filter 14 and then into the engine 10. The exhaust gases from the engine is carried by a suitable pipe 16 to a tower 18 where the gases are absorbed in water. Of course, multiple internal combustion engines hooked in parallel sequence may also be utilized for providing an increase of exhaust gases and for more power.

The engine 10 drives a pump 20 that receives water from a pipe 22 connected to a suitable source such as a well (not shown) and delivers that water to a discharge pipe 24, connected to a suitable irrigation system. Preferably, such piping including the pipes of the irrigation system will be composed of aluminum as is normally used for providing lightweight construction. A portion of the water discharged by the pump 20 is diverted through a pipe 26 to the tower 18 and after it has passed through the tower it is moved by a pump 28 through a return pipe 30 to return to the discharge pipe 24. The pump 28, as compared to the pump 20, is relatively small and may also be driven by the engine 10.

In FIG. 2, the piping diagram is shown in somewhat greater detail where it is seen that the fuel supply line 12 is provided with a valve 32 to permit the fuel flow to be controlled and is also provided with a pressure regulator 34 for those places where the pressure of the fuel supply may vary. From the regulator 34, the fuel goes through the filter 14 to the engine 10 as previously mentioned. The exhaust gases from the engine are delivered by the pipe 16 to the tower 18.

Water from the supply is carried by pipe 22 to pump 20 which discharges it through the pipe 24. A valve 36 permits control of the water from discharge pipe 24 through pipe 26 to the tower 18. A valve 38 controls the flow of treated enriched water from the tower 18 to pump 28 which in turn delivers the treated water to pipe 30 for return to the discharge pipe 24. Mechanical connections of the engine 10 to the pump 20 and the pump 28 are indicated by dotted lines.

Turning now to a description of some of the various elements in somewhat greater detail, the filter 14 for removing formation water, hydrogen sulfides, sulfur for instance from natural gas, is shown in cross-section in FIG. 3. As seen in that figure, the filter 14 includes a tubular member 40 provided with cast upper and lower end caps 42 and 44 respectively. The lower end cap 44 has a central aperture 46 threaded to receive the fuel supply pipe 12. The upper end cap 42 has a similar aperture 48 similarly threaded. Extending upwardly from the aperture 46 is a tubular projection 50 closed at its upper end by suitable means such as a plate or cap 52, while holes 54 in the side of the tubular member 50 permit the gaseous fuel coming from the pipe 12 to discharge laterally. The fuel, upon entering the filter 14, thus changes direction by approximately 90°, while entering into a larger chamber 56 formed by the tube 40. This directional change causes a sudden reduction in velocity so that heavier particulate matter and accumulated formation water carried by the fuel is dropped in the bottom of the chamber 56. A drain line 58 disposed in the bottom end cap 44 is closed by a plug 60 that may be removed to drain the water and particulate matter from the chamber 56.

Above the chamber 56 is a screen or similar member 62 that supports a bed of chemically active molecular sieve material 64 such as aluminum silicate. A certain amount of water that has not fallen to the bottom of chamber 56 will be stopped by the molecular sieve 64 and from there fall into the chamber 6 to be drained. The remaining impurities, such as hydrogen sulfide, are absorbed in the molecular sieve and the remaining fuel gas then passes on out through the aperture 48 in the upper end cap 42.

The filter 14 is especially suitable for cleaning natural gas and will typically have 1¼ inch to 2 inch inlet and outlet pipe. Typically working pressures will range from about 150 to 500 psi. However, these filters can be installed in parallel or can be increased in size to accommodate larger volumes or higher working pressures. Moreover, a reduction in fuel consumption from 6% to 13% after installing this type of gas filter has been found.

In this regard, it has been determined that the diaphragms in the regulator and carburetor of an engine are designed to operate on clean, dry fuel. Contaminates in the fuel, such as water, diesel or oil from volume tanks or sand, iron sulfides, and rust, cause the diaphragms to lose their resilience.

Once the diaphragms become wet or brittle, erratic fuel consumption results. The fuel mixture will oscillate from rich to lean and back to rich several times a minute once the diaphragms become contaminated. Accordingly, stabilized fuel mixtures will result only if the diaphragms are kept clean and dry such as by the use of fuel filter 18.

The construction of the tower 18 is indicated in FIG. 4. The function of the tower 18, as previously indicated, is the absorption of the carbon dioxide and oxides of nitrogen ($NO_x$) gases by the water. In this respect the construction and operation of the tower is comparable to that of many other similar absorption devices. A generally cylindrical housing 66 is closed at its upper end and lower end by members here shown as upper and lower domes 68 and 70 respectively. The engine exhaust pipe 16 is preferably connected a short distance above the lower dome 70 and the diverted water supply, provided by pipe 26, is connected to the interior of the housing 66 preferably near the upper dome 68. Just above the exhaust pipe 16 is a screen or similar member 71 that supports a bed of packing material 72 somewhat similar to aggregate. The material 72 preferably is a 1-inch ceramic material having a general U-shape, widely used in such absorption chambers and commercially available under the name "Berl Saddle Tower Pack".

Above the upper surface of the absorption pack 72 is an atomizer 74 connected to the pipe 26. While the atomizer may take any suitable shape, it has been found that a simple cross configuration such as shown in FIG. 5 is preferable. Holes 76 in the lower surface of the atomizer 74 direct water onto the absorption pack 72 as the exhaust gases from the exhaust pipe 16 are rising through the pack 72 in a countercurrent direct contact fashion.

If desired, a mist extractor 78 in the form of a wire mesh or other suitable means may be placed above the atomizer 74 to aid in confining the water discharged into the housing 66. An opening 80 in the upper end of the dome 68 permits the ready escape of the exhaust gases after they have passed through the housing 66.

At the lower end of the tower 18, the lower dome 70 has an opening 82 through which the treated enriched water is removed. As previously indicated, this water is moved by pump 28 through pipe 30 back to the discharge pipe 24. To prevent the treated water from filling the lower dome 70 and flowing into the exhaust pipe 16, a back-flow eliminator is provided which consists essentially of a vertically extending pipe 84 connected to the interior of the lower dome 70. The pipe 84 is preferably positioned a slight distance below the lowermost surface of the exhaust pipe 16. In this way, if the water in the lower dome 70 rises towards the exhaust pipe 16, the water will be channelled to the back-flow eliminator 84 before the water can flow into the exhaust pipe 16.

In the operation of the system, the fuel such as natural gas containing water, particulate matter, sulfides and other contaminants passes through the filter 14 to power the engine 10. Frequently, very satisfactory results are obtained by using the gas in the condition it is furnished but this is generally true only if the gas has previously been cleaned. In the case of gas taken directly from the earth, the contaminants present in the gas in its natural state generally will reduce spark plug and valve efficiency of the engine 10. Thus, the filter 14 is an important feature of the complete system.

The exhaust gases including $CO_2$ and $NO_x$ gases from the engine 10 are fed through the exhaust pipe 16 through the tower 18. Since it is desirable to increase the fertilizing characteristics of the discharge water as much as possible, it is also desirable to produce as much $CO_2$ and oxides of nitrogen as possible.

Accordingly, the engine 10 is preferably operated to provide the maximum of these gases by utilizing an air to fuel ratio, ranging from about 12 to 15 parts air to one part fuel, and increasing the voltage sequentially applied across the sparkplugs of an electronic ignition system from approximately 15,000 volts to between 40,000 and 50,000 volts. The preferred air to fuel ratio is 13 to 1. The firing time is preferably lengthened for greater total combustion and the spark is advanced approximately six degrees of the crankshaft's rotation. The engine will preferably have a cubic inch displacement of from about 200 to 1500 cubic inches and 1100 to 2800 rpm. With these conditions, the temperature of the gas in the combustion chamber of the engine 10 will range from about 1200° F. to 1500° F. and exhaust gases having a range from about 600° F. to 900° F. and optimum results are obtained. It will be understood, of course, that if desired, appropriate catalysts may be installed in the exhaust pipe 16 to convert more of the gases into nitrous oxide. It has been found that approximately 2 parts per million of nitrogen and 15 to 50 parts per million $CO_2$ in the treated water will be derived from the present invention. Also, it has been determined that water having an initial pH of 8 will be considerably lowered after treatment to about a pH of 7 to 7.5.

Since the water in the discharge line 24 may be moving at a relatively fast rate but may not have much pressure, the preferred method of securing the bypass water for the line 26 is to insert a Pitot tube into the discharge line 24, with the opening of the Pitot tube facing upstream. In this way the velocity of the water flowing into the Pitot tube acts as a ram to force the water into the tower 18.

To inject the treated water into the discharge line 24 with the least expenditure of energy, the line 30 from the pump 28 extends into the discharge line 24 and opens into the water flowing in that line so that the treated water is directed into the discharge stream as by a venturi. The general construction of the Pitot tube is shown in FIG. 6 and the general construction of the venturi is shown in FIG. 7.

Tests have indicated that the system herein described and shown is very satisfactory in increasing the agricultural productivity of the land. In those areas where natural gas is found, it is frequently very easy to tap a source of such gas and use it with appropriate filtration to operate an engine. Gas that might otherwise be wasted is thus put to a useful purpose. Furthermore, the exhaust gases from the engine which are rich in carbon dioxide and nitrogen oxides are then put to useful purposes by dissolving these oxides in water so that fixed nitrogen is formed that can be assimilated by growing plants. Thus the carbon dioxide and nitrogen oxides, instead of being unwanted contaminants of the air, are put to useful purpose.

Moreover, the treated water with increased $CO_2$ will reclaim alkali soil by neutralizing salts present in the soil and promote the decay of organic matter in the soil. Additionally, soil, when wetted with $CO_2$ treated water, has been found to have increased water penetration and ability to utilize nitrogen.

While a preferred form of the invention has been disclosed, it will be appreciated that modifications may be made therein without departing from the broad concept. Consequently, this patent is not to be restricted to the particular form or arrangements of parts herein described and shown except as limited by the claims.

I claim:

1. A method for producing and adding fertilizing ingredients to irrigation water by converting exhaust gases from an engine to obtain an aqueous solution comprising from about 15 to 50 ppm $CO_2$ and about 2 ppm nitrogen, the method comprising the steps of:
   operating an internal combustion engine, said engine being operated at a temperature range of 1200° F. to 1500° F. in the combustion chamber of said engine and with an air to fuel ratio ranging from about 12 to 15 parts air to 1 part fuel and increasing the voltage from 15,000 volts to about 40,000 to 50,000 volts across the spark plugs of the engine so as to produce an exhaust gas having a maximum of carbon dioxide and nitrogen oxide gases;
   absorbing carbon dioxide and nitrogen oxide gases in water to form treated water; and
   adding said treated water to said irrigation water.

2. A method as defined in claim 1 wherein said internal combustion engine is powered by a fuel selected from the group consisting of natural gas, liquified petroleum, diesel fuel, and mixtures thereof.

3. A method as defined in claim 1 wherein said internal combustion engine is used to drive an irrigation pump.

4. A method as defined in claim 1 in which said exhaust gases are directly contacted with a continuous flow of water.

5. A method as defined in claim 1 in which said internal combustion engine is powered by natural gas, said engine is adjusted to provide a temperature in the combustion chamber of about 1200° F. to 1500° F., and in which said exhaust gases are directly contacted with a continuous spray of water in a countercurrent manner.

* * * * *